United States Patent
Yamanishi

(10) Patent No.: US 7,072,685 B2
(45) Date of Patent: Jul. 4, 2006

(54) DIGITAL/ANALOG BROADCAST RECEIVER

(75) Inventor: Yoshihiro Yamanishi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 417 days.

(21) Appl. No.: 10/172,784

(22) Filed: Jun. 14, 2002

(65) Prior Publication Data

US 2002/0197968 A1   Dec. 26, 2002

(30) Foreign Application Priority Data

Jun. 18, 2001   (JP)   ............... P.2001-183240

(51) Int. Cl.
*H04M 1/00* (2006.01)
(52) U.S. Cl. ............... 455/553.1; 455/191.3; 455/180.2
(58) Field of Classification Search ............... 455/3.01, 455/3.02, 3.04, 3.06, 176.1, 179.1, 180.2, 455/184.1, 186.2, 191.3, 552.1, 553.1
See application file for complete search history.

(56) References Cited

U.S. PATENT DOCUMENTS

| | | | | |
|---|---|---|---|---|
| 5,584,051 A | * | 12/1996 | Goken | ............... 455/68 |
| 6,023,611 A | * | 2/2000 | Bolin et al. | ............... 455/114.1 |
| 6,305,019 B1 | * | 10/2001 | Dyer et al. | ............... 725/91 |
| 6,317,168 B1 | * | 11/2001 | Seo | ............... 348/725 |
| 6,498,960 B1 | * | 12/2002 | Uramoto | ............... 700/94 |
| 6,501,510 B1 | * | 12/2002 | Moon | ............... 348/553 |
| 6,741,293 B1 | * | 5/2004 | Obuchi | ............... 348/554 |
| 2002/0151272 A1 | * | 10/2002 | Simon | ............... 455/3.06 |

* cited by examiner

*Primary Examiner*—Nguyen T. Vo
*Assistant Examiner*—Nhan T. Le
(74) *Attorney, Agent, or Firm*—Osha Liang LLP

(57) ABSTRACT

When a digital broadcasting channel and an analog broadcasting channel, over which the same program is currently being transmitted, are provided by a broadcasting station, upon each depression of a digital/analog switching button on an operating unit, an MPU alternately switches between the digital broadcasting channel and the analog broadcasting channel across which the program is being transmitted. And when the current broadcasting station provides a digital broadcasting channel and an analog broadcasting channel across which the same program is currently being transmitted, the MPU alternately switches between a predetermined digital broadcasting channel and a predetermined analog broadcasting channel.

8 Claims, 5 Drawing Sheets

FIG. 2

| MAJOR NUM. | MINOR NUM. | SHORT NAME | CARRIER FREQUENCY (MHz) | CHANNEL TSID | PROGRAM NUM. | FLAGS | SERVICE TYPE | SOURCE ID | DESCRIPTORS |
|---|---|---|---|---|---|---|---|---|---|
| 12 | 0 | NBZ | 205.25 | 0x0AA0 | 0x0AA0 | — | ANALOG | 20 | ch_name |
| 12 | 1 | NBZD | 620.31 | 0x0AA1 | 0x00F1 | — | DIGITAL | 21 | ch_name serv-locat. |
| 12 | 5 | NBZ-E | 620.31 | 0x0AA1 | 0x00F2 | — | DIGITAL | 2 | ch_name serv-locat. |
| 12 | 12 | NBZ-M | 620.31 | 0x0AA1 | 0x00F3 | — | DIGITAL | 23 | ch_name serv-locat. |
| 12 | 31 | NBZ-H | 620.31 | 0x0AA1 | 0x00F8 | — | DIGITAL | 24 | ch_name serv-locat. |

28

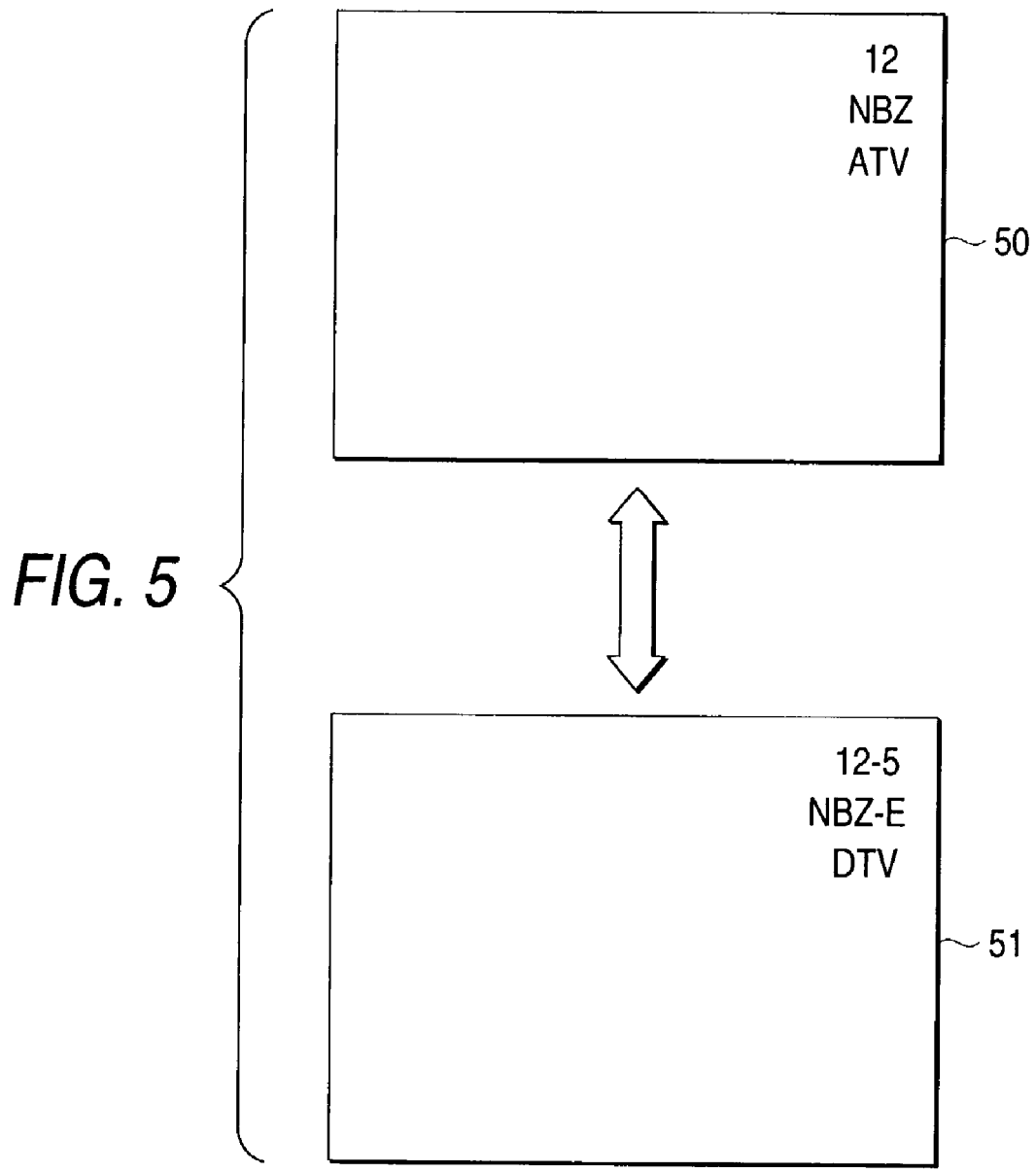

DIGITAL/ANALOG BROADCAST RECEIVER

BACKGROUND OF THE INVENTION

1. Field of the Invention

The present invention relates to a digital/analog broadcast receiver that can selectively receive a digital broadcast and an analog broadcast.

2. Description of the Related Art

Various vehicular television receivers for receiving analog broadcasts have been devised that enable programs currently being viewed to be watched continuously, even when, as the vehicles on which the receivers are mounted move, reception conditions change, and the channels carrying the programs are gradually altered. For example, disclosed in JP-A-2000-138871 is a television receiver that includes a function for either automatically tuning in a broadcasting station or for switching to an affiliated station, thereby making the uninterrupted viewing of a program possible.

It can be said that the present is a transition period during which broadcasting is being shifted from the transmission of analog to digital signals. In the course of this transition period, an interval (henceforth called a simultaneous broadcasting period) is required during which a broadcasting station provides both analog and digital broadcasts. During this simultaneous broadcasting period, programs can be viewed using either analog broadcast receivers or digital broadcast receivers; or combination digital/analog broadcast receivers can be employed that selectively receive either digital broadcasts or analog broadcasts.

For the analog broadcasting, one channel (a physical channel) is provided for one frequency band allocated for each broadcasting station. For the digital broadcasting, however, one channel (a physical channel) and multiple channels (virtual channels) obtained by dividing physical channels are provided for one frequency band allocated for each broadcasting station. Therefore, for digital broadcasting, more programs can be broadcast using a limited frequency band.

The television receiver disclosed in JP-A-2000-138871 stores, in advance, data including the channel numbers of broadcasting stations that broadcast the same program, and employs this data to automatically change channels. However, when this technique is applied for a digital/analog broadcast receiver, since a digital broadcast channel on which an analog broadcast program is available is not set up for simultaneous broadcasting, channel numbers can not be stored in advance, and therefore, the digital broadcasting channel and the analog broadcasting channel on which the same program is provided can not be switched.

For a conventional digital/analog broadcast receiver, by depressing a channel return key provided on a remote controller or on the front panel of the receiver, a current channel can be changed to a preceding channel across which a program was previously received. However, in order to switch between a digital broadcast and an analog broadcast for a predetermined channel, a user must tune in the desired channel by physically entering the channel number.

SUMMARY OF THE INVENTION

The present invention has been made to solve the above problems, and therefore an object of the invention is to provide a digital/analog broadcast receiver that, through the manipulation of a single key, can easily be switched between a digital broadcasting channel and an analog broadcasting channel.

To achieve this object, according to one aspect of the present invention, a digital/analog broadcast receiver, which can selectively receive a digital broadcast or an analog broadcast through the manipulation of an operating unit provided for tuning, comprises:

a digital/analog switching button provided for the operating unit; and an MPU for controlling the operating unit, wherein, when a broadcasting station from which a transmission is being received includes a digital broadcast channel and an analog broadcast channel across which a program having the same content is currently being broadcast, upon each depression of the digital/analog switching button, the MPU alternately switches between the digital broadcast channel and the analog broadcast channel, and wherein, when a broadcasting station from which a transmission is being received does not include a digital broadcast channel and an analog broadcast channel across which a program having the same content is currently being broadcast, the MPU alternately switches between a predetermined digital broadcasting channel and a predetermined analog broadcasting channel.

Therefore, since the user need simply depress the D/A switching button to alternately view the digital/analog broadcast of the program having the same content, the user can more easily experience the difference in the reception quality provided by the digital/analog broadcasts. Thus, when a digital/analog broadcast receiver 10 is exhibited at the front of a store, for example, the superiority of the reception quality provided by the digital broadcast can be more effectively demonstrated, and better sales promotion results obtained.

Further, according to another aspect of the present invention, provided is a digital/analog broadcast receiver that can selectively receive digital broadcasts and analog broadcasts, wherein each time a signal for switching between digital broadcasting and analog broadcasting is received, a predetermined digital broadcasting channel and a predetermined analog broadcasting channel are alternately switched to.

Since by employing a single manipulation a user can easily switch between digital and analog broadcasting, the user can easily experience the difference in the reception quality afforded by the two broadcast systems. Thus, when a digital/analog broadcast receiver 10 is exhibited at the front of a store, for example, the superiority of the reception quality provided by the digital broadcast can be more effectively demonstrated, and better sales promotion results obtained.

For a digital/analog broadcast receiver, the same channel may be used for the digital broadcasting channel and the predetermined analog broadcasting channel. Therefore, a user can actually experience the difference in the reception quality afforded by digital and analog broadcasts that are transmitted under the same conditions.

Further, with a digital/analog broadcast receiver, the same program may concurrently be transmitted over the predetermined digital broadcasting channel and the predetermined analog broadcasting channel. As a result, the difference in the reception quality afforded by the digital and analog broadcasts can be more easily experienced by viewing and listening to images and sounds provided for the same contents.

BRIEF DESCRIPTION OF THE DRAWINGS

FIG. 2 is a diagram showing a virtual channel table used by the digital/analog broadcast receiver of the invention.

FIG. 5 is a diagram in which is shown an image in which a channel number, for example, is provided by the digital/analog broadcast receiver of the invention.

DETAILED DESCRIPTION OF THE PREFERRED EMBODIMENTS

Figure 1:
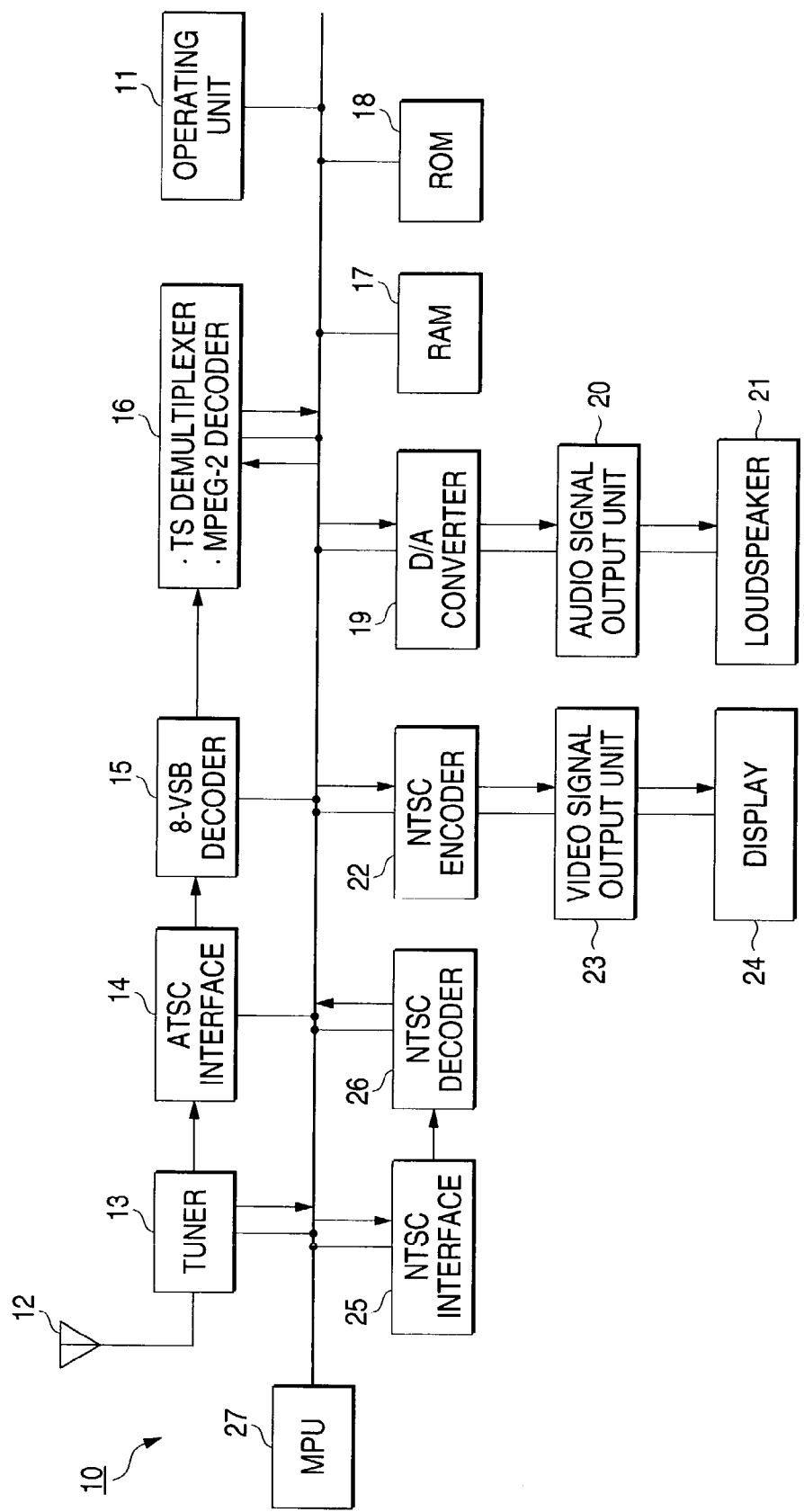
FIG. 1 is a block diagram showing the configuration of a digital/analog broadcast receiver according to the present invention.

A digital/analog broadcast receiver in accordance with the ATSC (Advanced TV System Committee) standards, which are the digital broadcasting standards for the United States, will now be described as an example. FIG. 1 is a block diagram showing the configuration of a digital/analog broadcast receiver 10. An operating unit 11, which may be a remote controller, is employed by a user to perform various operations, such as powering the receiver on or off or channel tuning. An antenna 12 is used to receive a digital/analog broadcasting wave that a tuner 13 uses to tune in to a digital/analog broadcast on a desired channel. An ATSC interface (hereinafter referred to as an ATSC IF) extracts a digital output wave from the tuner 13 and an 8-VSB decoder 15 demodulates the digital output wave to obtain data.

An IC 16 includes a TS demultiplexer for separating, into types, data demodulated by the 8-VSB decoder 15, and an MPEG-2 decoder for decoding the separated data to obtain data available before compression. A RAM 17 is used to store data separated by the TS demultiplexer of the IC 16, and a ROM 18 is used to store information required for the operation of the digital/analog broadcast receiver 10. A D/A converter 19 converts into analog data audio data output by the IC 16, and an audio signal output unit 20 outputs the analog audio data obtained by the D/A converter 19. A loudspeaker 21 is used to release sounds.

An NTSC encoder 22 decodes video data, previously decoded by the MPEG-2 decoder, to obtain an NTSC decoding television signal, and a video signal output unit 23 outputs the NTSC decoding television signal. A display 24 is used to display the video.

An NTSC interface (hereinafter referred to as an NTSC IF) extracts an analog output wave from the tuner 13, and an NTSC decoder 26 converts the analog output wave into a digital signal. While an MPU 27 controls the operation of the digital/analog broadcast receiver 10.

<Processing for Receiving a Digital Broadcast>

The processing performed by the digital/analog broadcast receiver 10 when receiving a digital broadcast will now be described. First, a transmitted digital broadcast is received at the antenna 12. When for tuning the operating unit 11 is manipulated, the tuner 13 switches a transponder for reception. The received digital broadcast wave is then transmitted through the ATSC IF 14, and the data is demodulated by the 8-VSB decoder 15.

Originally, a digital signal is transmitted as a TS (Transport Stream) packet by a transmission side. The TS packet is formed of control data, including video data, audio data and a virtual channel table (hereinafter referred to as a VCT) 28, which is defined in ATSC A65-A in FIG. 2, and the control data is separated by the TS demultiplexer of the IC 16 and is stored in the PAM 17. Then, the data read from the RAM 17 is decoded by the MPEG-2 decoder to obtain data available before compression. Then, the audio data is converted into analog data by the D/A converter 19, and after passing through the audio signal output unit 20, are output as sounds by the loudspeaker 21. Further, the video data is decoded by the NTSC encoder 22 to obtain an NTSC decoded television signal, and an image is displayed on the display 24 by the video signal output unit 23.

<Processing for Receiving an Analog Broadcast>

The processing performed by the digital/analog broadcast receiver 10 for receiving an analog broadcast will now be described. First, a transmitted analog broadcast wave is received at the antenna 12. Then, when for tuning the operating unit 11 is manipulated, the tuner 13 switches a transponder for reception, and the received analog broadcast wave is transmitted through the NTSC IF 25 and is converted into a digital signal by the NTSC decoder 16. Thereafter, the digital signal is transmitted to the IC 16, and is processed in the same manner as for the digital broadcast. In this case, since the NTSC decoder 26 is provided between the IF 25 and the IC 16, the IC 16 can be employed in common for both digital and analog broadcasting.

For tuning, the user employs the operating unit 11 to designate a virtual channel, which includes a main channel and a sub-channel. In the VCT 28 in FIG. 2, major num. corresponds to the main channel and minor num. corresponds to the sub-channel. In FIG. 2, the virtual channel for which the minor num. is "0" represents an analog broadcast. Hereinafter, assume that the interval between the number of the main channel and the number of the sub-channel is delimited by using a "-", and that "12-23",for example, represents main channel 12 and sub-channel 34.

(Digital/Analog Broadcast Switching Processing)

An explanation will now be given for the digital/analog broadcast switching processing. Each time a user depresses a D/A switching button (not shown) provided for the operating unit 11, i.e., each time a signal for switching between digital broadcasting and analog broadcasting is received, the active channel is changed from one for a digital broadcast to one for an analog broadcast, or from one for an analog broadcast to one for a digital broadcast.

Figure 3:
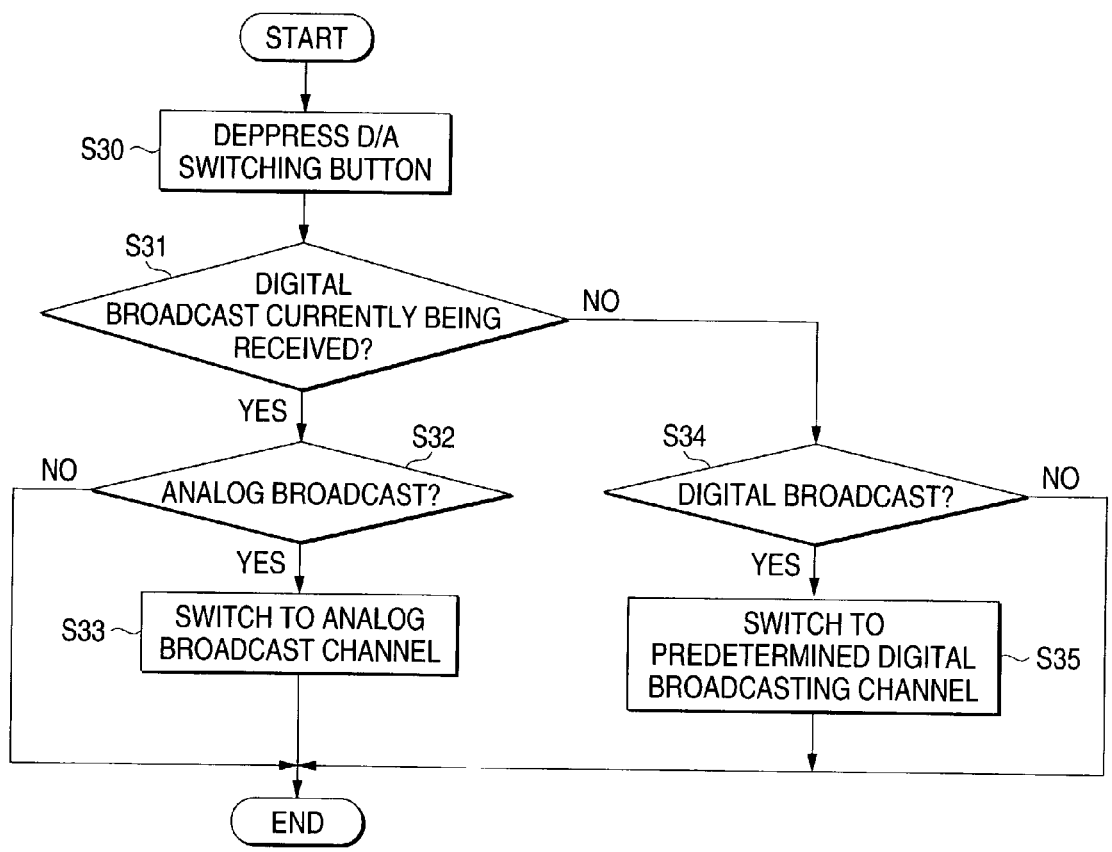
FIG. 3 is a flowchart showing an example operation performed by the digital/analog broadcast receiver of the invention.

FIG. 3 is a flowchart showing example digital/analog broadcast switching processing performed by the digital/analog broadcast receiver 10. When a D/A switching button is depressed at step S30, at step S31 a check is performed to determine which type of broadcast, digital or analog, is currently being received. This determination can be obtained by determining whether the minor num. of the current channel is "0". That is, when the minor num. is "0", an analog broadcast is currently being received, and when the minor num. is other than "0", a digital broadcast is currently being received.

When it is ascertained at step S31 that a digital broadcast is currently being received, at step S32 a check is performed to determine whether an analog broadcast is also being transmitted by the current broadcasting station. For this determination, a VCT 28 is employed to search for channels for which the major num. corresponds to the current major num., and when one is found, a check is performed to determine whether the minor num. of that channel is "0".

When it is ascertained at step S32 that an analog broadcast is being transmitted by the current broadcasting station, at step S33 the channel is switched to the analog broadcast channel. Whereas when it is ascertained at step S32 that an analog broadcast is not being transmitted by the current broadcasting station, the channel is not changed, and the digital/analog broadcast switching processing is terminated.

When it is ascertained at step S31 that an analog broadcast is currently being received, at step S34 a check is performed to determine whether a digital broadcast is also being transmitted by the current broadcasting station. For this determination, the VCT 28 is employed to search for channels for which the major num. corresponds to the current major num., and when one is found, a check is performed to determine whether the minor num. of that channel is other than "0".

When it is ascertained at step S34 that a digital broadcast is being transmitted by the current broadcasting station, at step S35 the channel is changed to a predetermined digital broadcast channel selected from among those that are available. Whereas when it is ascertained at step S34 that a digital broadcast is not being transmitted by the current broadcasting station, the channel is not changed and the digital/analog broadcast switching processing is terminated.

A predetermined digital broadcast channel at step S35 can be set in advance during the manufacturing process, for example, and can, in this instance, be a channel, selected from among the available digital broadcast channels, that has a minimum minor num.

When, for example, a digital broadcast is being received on channel 12-5 and the D/A switching button is depressed, it is ascertained that a digital broadcast is being received because the minor num. of the current channel is "5". Then, the VCT 28 is employed to search for channels having the same major num., "12", as the current channel. Since a channel having the minor num. "0" is found, it is ascertained that an analog broadcast is being transmitted by the current broadcasting station. Thereafter, channel 12-5 is changed to channel 12-0 (generally described as 12) for analog broadcasting.

When the D/A switching button is depressed while an analog broadcast is being received on channel 12 (channel 12-0 according to the VCT 28), it is ascertained that the analog broadcast is being received because the minor num. of the current channel is "0". Then, the VCT 28 is employed to search for channels having the same major num., "12", as the current channel. Since there is a channel that has a minor num. other than "0", it is ascertained that a digital broadcast is be transmitted by the current broadcasting station. As a result, the channel is changed to channel 12-1, which has the minimum minor num. and which is selected from among the pertinent digital broadcast channels.

As a result, since a user need only depress the D/A switching button to alternately view the digital and analog broadcasts, the user can more easily experience the difference in the reception quality afforded by the digital and the analog broadcasts. Thus, when a digital/analog broadcast receiver 10 is exhibited at the front of a store, for example, the superiority of the reception quality provided by the digital broadcast can be more effectively demonstrated, and better sales promotion results obtained.

Figure 4:
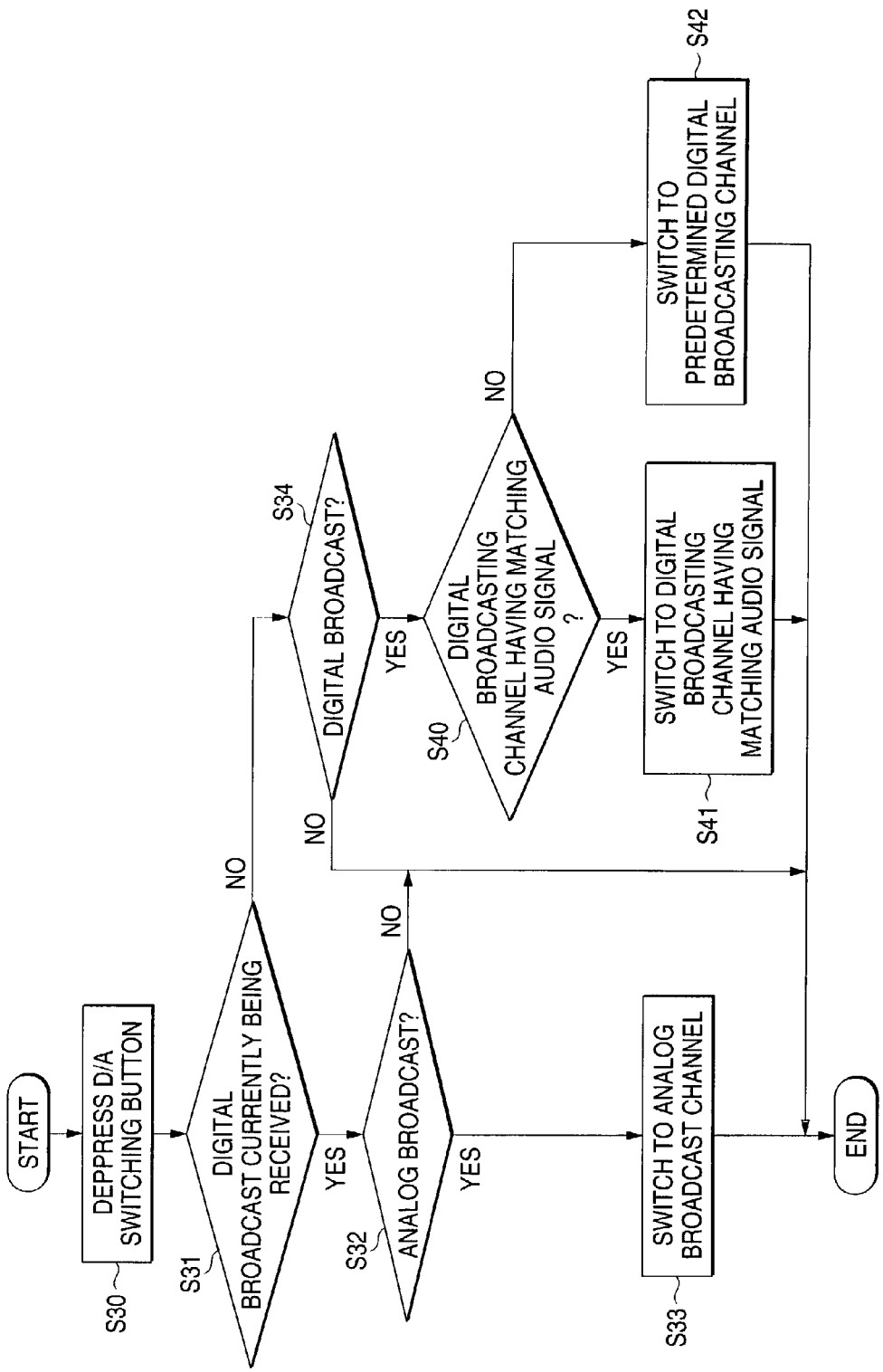
FIG. 4 is a flowchart showing another example operation performed by the digital/analog broadcast receiver of the invention.

An explanation will now be given for a digital/analog broadcast receiver 10 that, upon the. depression of the D/A switching button to switch from an analog to a digital broadcast, changes a current channel to a digital broadcast channel, if available, on which a program is being transmitted for which the contents are the same as those for the current analog broadcast. FIG. 4 is a flowchart showing another example of the digital/analog broadcast switching processing performed by the digital/analog broadcast receiver 10. Since steps S30 to S34 are the same as those in the flowchart in FIG. 3, no further explanation for them will be given.

When it is ascertained at step S34 that a digital broadcast is being transmitted by the current broadcasting station, at step S40 audio signals for digital broadcast channels are compared with the audio signal for the analog broadcast that is currently being received to determine whether there is a digital broadcast channel having an audio signal that matches the audio signal for the analog broadcast. When at step S40 a matching audio signal is found, the channel is changed at step S41 to the digital broadcast channel on which this audio signal is carried. But when at step S40 a matching audio signal is not found, at step S42 the channel is changed to a predetermined broadcast channel selected from among the digital broadcast channels.

When, for example, the same program is being carried on analog broadcasting channel 12 and digital broadcasting channel 12-5, and when the D/A switching button is depressed while the broadcast is currently being received on channel 12, it is ascertained that the analog broadcast is currently being received because the minor num. of the current channel is "0" When the VCT 28 is employed to examine channels having the same major num., "12", as the current channel, and a channel is found that has a minor num. other than "0", it is ascertained a digital broadcast is being transmitted by the current broadcasting station.

The audio signals for the pertinent digital broadcasting channels 12-1, 12-5, 12-12 and 12-31, which are obtained through the examination, are compared with the audio signal for the current channel 12 to determine whether there is a digital broadcasting channel for which the audio signal is the same as that for channel 12. Since the audio signal for channel 12-5 matches the audio signal for channel 12, the current channel is changed to channel 12-5.

Therefore, since the user need only depress the D/A switching button to alternately view the digital/analog broadcasts for the same program, the user can more easily experience the difference in the reception quality between the digital and analog broadcasts. Thus, when a digital/analog broadcast receiver 10 is exhibited at the front of a store, for example, the superiority of the reception quality provided by the digital broadcast can be more effectively demonstrated, and better sales promotion results obtained.

When the digital/analog broadcasts are switched by the digital/analog broadcast receiver of this invention, an image indicating a current channel number, the name of a broadcasting station and a digital or analog broadcast may be superimposed on the current video and displayed for a specific period of time. FIG. 5 is a diagram showing images 50 and 51 on which channel numbers are displayed. On image 50, channel "12", broadcasting station "NBZ" and analog broadcast "ATV" are displayed, while on image 51, channel "12-5",broadcasting station "NBZ-E" and digital broadcast "DTV" are displayed. Further, the display/non-display of the image 50 or 51 may be arbitrarily switched when the user manipulates a display/non-display switching button (not shown) on the operating unit 11. Thus when the image 50 or 51 is displayed, the user can easily identify the digital/analog broadcast that is currently being received.

The data for a short name (broadcasting station name) entered in the VCT 28 can be employed as the broadcasting station name displayed on the images 50 and 51. Thus, when an analog broadcast is being received, to display the broadcasting station name, only data in the VCT 28 that is related to a previously received analog broadcast need be employed The digital/analog broadcast receiver of the invention is applied not only for the ATSC standards explained in the embodiment, but also for other standards, so long as channel numbers and data provided for identifying the digital/analog broadcasts are included, as in the VCT 28.

In the above embodiment, a digital/analog television system has been explained wherein the digital/analog broadcast receiver 10 is integrally formed with the loudspeaker 21 and the display 24. However, a digital/analog broadcast receiver, such as a digital/analog broadcast tuner or a video system, that does not include the loudspeaker 12 and the display 24, may also be employed.

According to the digital/analog broadcast receiver of the present invention, a predetermined digital broadcasting channel and a predetermined analog broadcasting channel are alternately switched between each time a signal is received for switching to a digital broadcast or an analog broadcast. Thus, since a user can employ a single operation to switch between a digital and an analog broadcast, the user can easily experience the difference in the reception quality afforded by the two broadcast types. Therefore, when a digital/analog broadcast receiver is exhibited at the front of a store, for example, the superiority of the reception quality provided by a digital broadcast can be demonstrated, and better sales promotion results obtained.

In addition, since with the digital/analog broadcast receiver a predetermined digital broadcasting channel and a predetermined analog broadcasting channel are for the same broadcasting station, a user can experience the difference in the reception quality afforded by digital and analog broadcasts that are transmitted under the same conditions.

Furthermore, since with the digital/analog broadcast receiver a predetermined digital broadcasting channel and a predetermined analog broadcasting channel are for the same broadcasting station, the difference in the reception quality afforded by the digital and the analog broadcasts can be physically experienced using the video and the sounds for the same contents.

What is claimed is:

1. A method for switching between a digital broadcast and an analog broadcast comprising:
   pushing a digital/analog switching button on an operating unit;
   determining whether a current broadcast is digital, wherein the current broadcast is displayed on a current broadcast channel;
   if the current broadcast is digital:
      switching to a predetermined analog broadcasting channel, wherein the predetermined analog broadcasting channel broadcasts the same content as the current broadcast channel;
   if the current broadcast is not digital:
      comparing a first audio signal of the current broadcast with a second audio signal, wherein the second audio signal is associated with a digital broadcast displayed on a digital broadcast channel, wherein the current broadcast is analog;
      switching to the digital broadcast channel, if the first audio signal and the second audio signal match; and
      switching to a predetermined digital broadcast channel, if the first audio signal and the second audio signal do not match.

2. The method of claim 1, wherein determining whether the current broadcast is digital comprises determining whether a minor number associated with the current broadcast channel is non-zero.

3. The method of claim 1, wherein the predetermined analog broadcasting channel and the current broadcast channel have an identical major channel number.

4. The method of claim 1, wherein if the first audio signal and the second audio signal match, then the digital broadcast channel comprises content identical to the current broadcast.

5. A digital/analog broadcast receiver, comprising:
   an operating unit comprising a digital/analog switching button for switching between a digital broadcast and an analog broadcast; and
   an MPU configured to control the operating unit;
   wherein if the digital/analog switching button is pushed, the digital/analog broadcast receiver is configured to:
      determine whether a current broadcast is digital, wherein the current broadcast is displayed on a current broadcast channel; and
      if the current broadcast is digital:
         switch to a predetermined analog broadcasting channel, wherein the predetermined analog broadcasting channel broadcasts the same content as the current broadcast channel;
      if the current broadcast is not digital:
         compare a first audio signal of the current broadcast with a second audio signal, wherein the second audio signal is associated with a digital broadcast displayed on a digital broadcast channel, wherein the current broadcast is analog;
         switch to the digital broadcast channel, if the first audio signal and the second audio signal match; and
         switching to a predetermined digital broadcast channel, if the first audio signal and the second audio signal do not match.

6. The digital/analog broadcast receiver of claim 5, wherein determining whether the current broadcast is digital comprises determining whether a minor number associated with the current broadcast channel is non-zero.

7. The digital/analog broadcast receiver of claim 5, wherein the predetermined analog broadcasting channel and the current broadcast channel have an identical major channel number.

8. The digital/analog, broadcast receiver of claim 5, wherein if the first audio signal and the second audio signal match, then the digital broadcast channel comprises content identical to the current broadcast.

* * * * *